Figure 1:
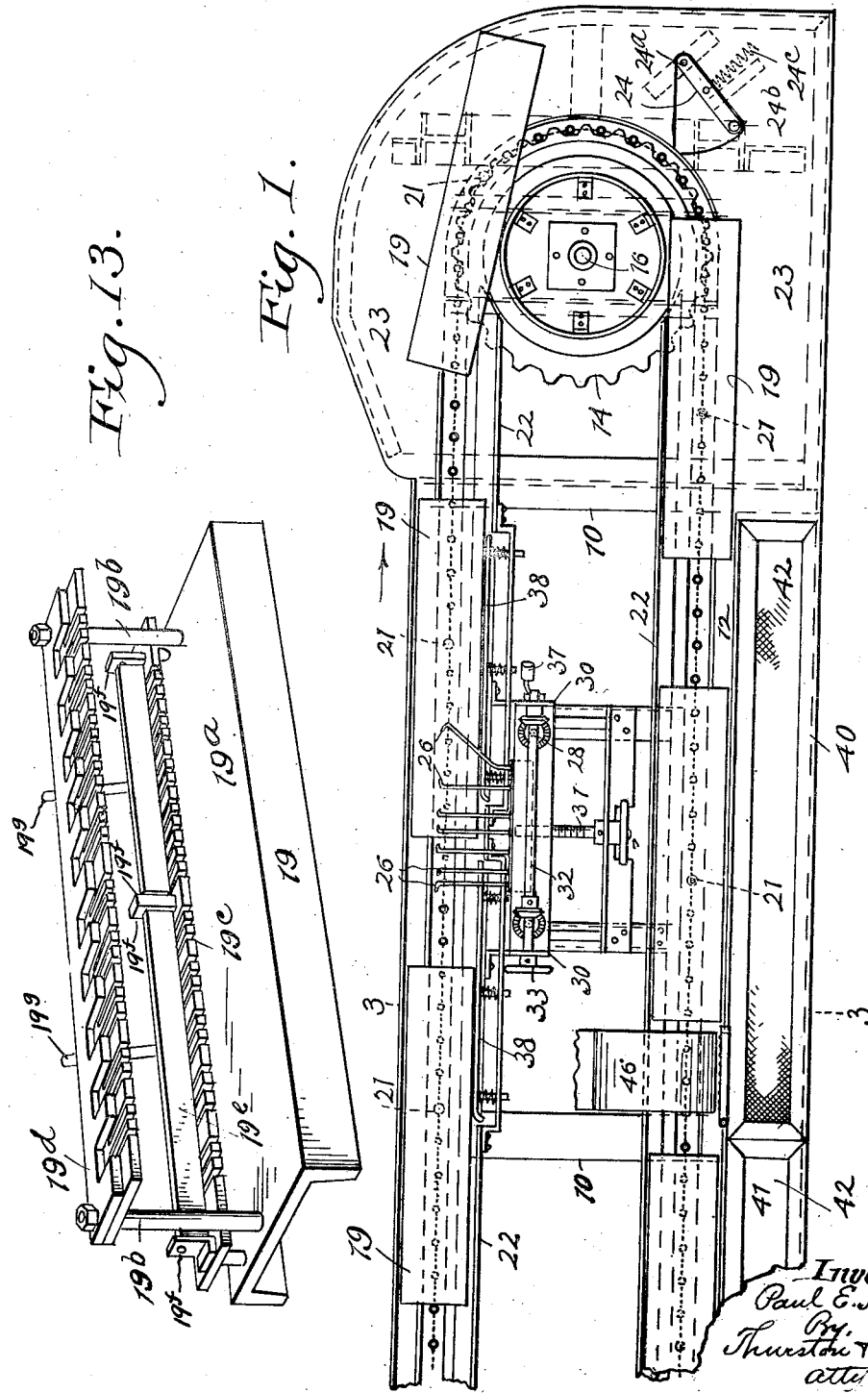

P. E. NORRIS.
LEAD BURNING MACHINE FOR STORAGE BATTERY PLATES.
APPLICATION FILED OCT. 10, 1918.
1,389,155.
Patented Aug. 30, 1921.
4 SHEETS—SHEET 2.
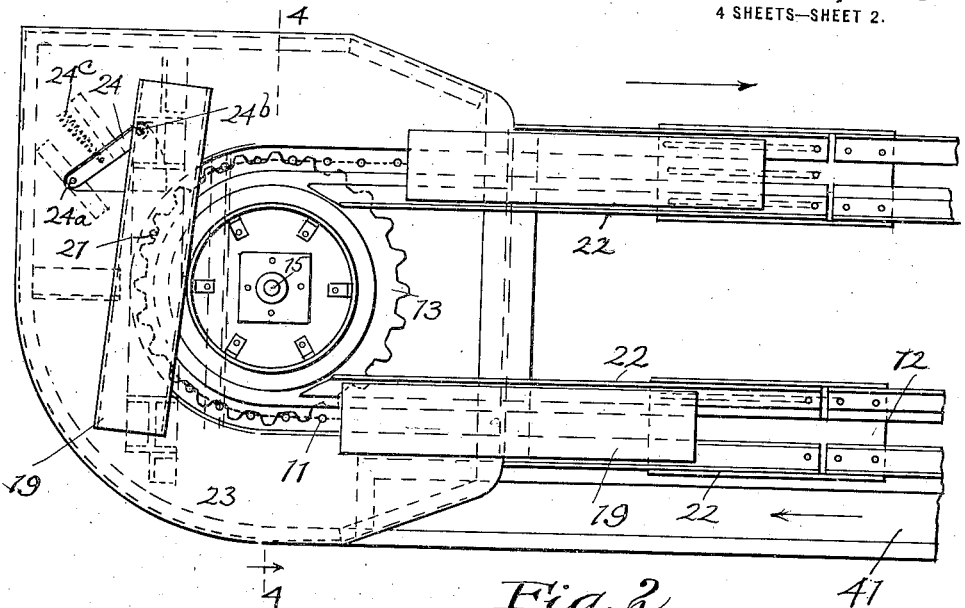
Fig. 2.
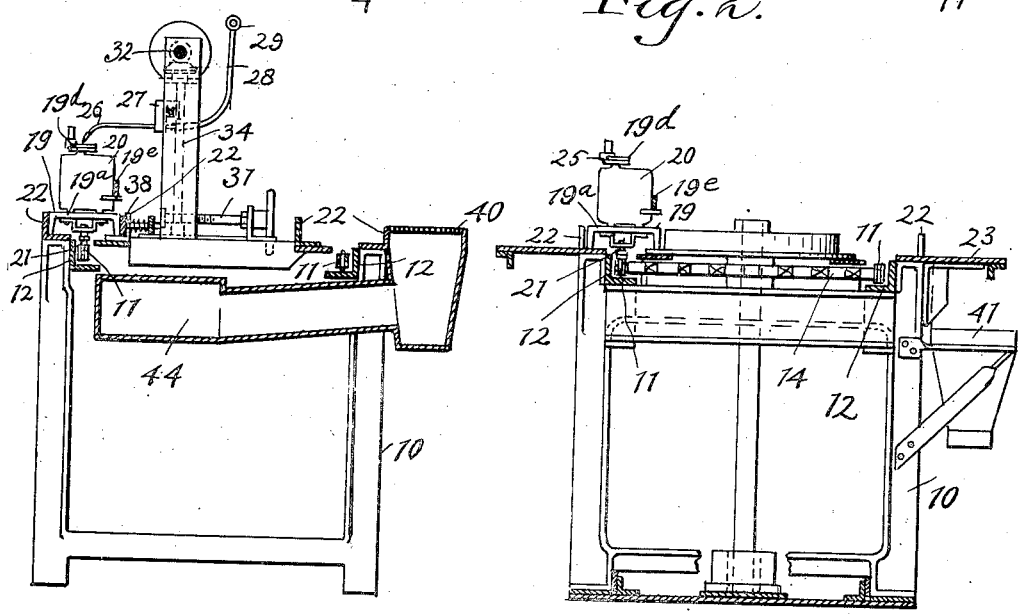
Fig. 3.
Fig. 4.
Inventor:
Paul E. Norris
By
Thurston & Kivis
attys.

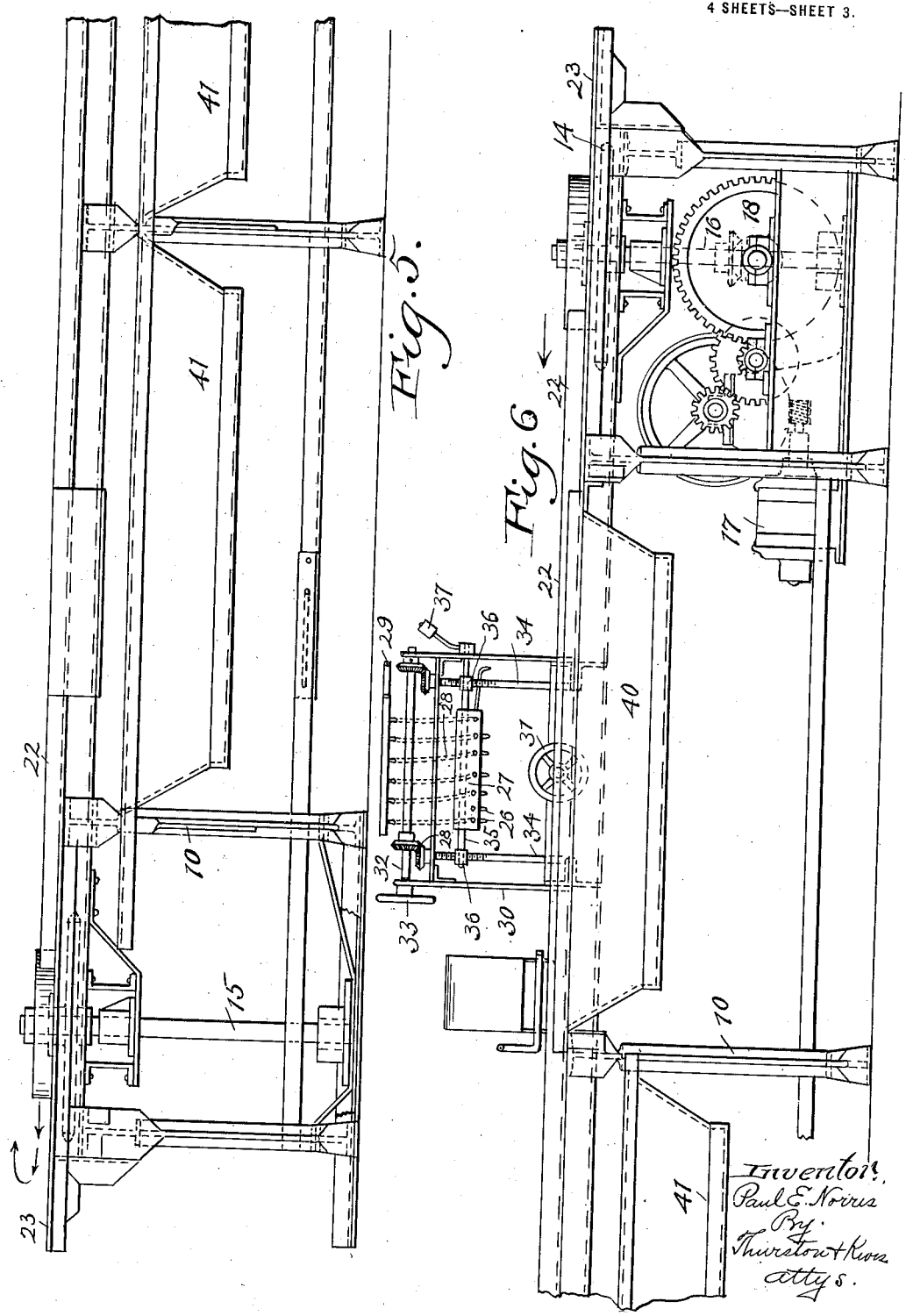

P. E. NORRIS.
LEAD BURNING MACHINE FOR STORAGE BATTERY PLATES.
APPLICATION FILED OCT. 10, 1918.
1,389,155.
Patented Aug. 30, 1921.
4 SHEETS—SHEET 4.
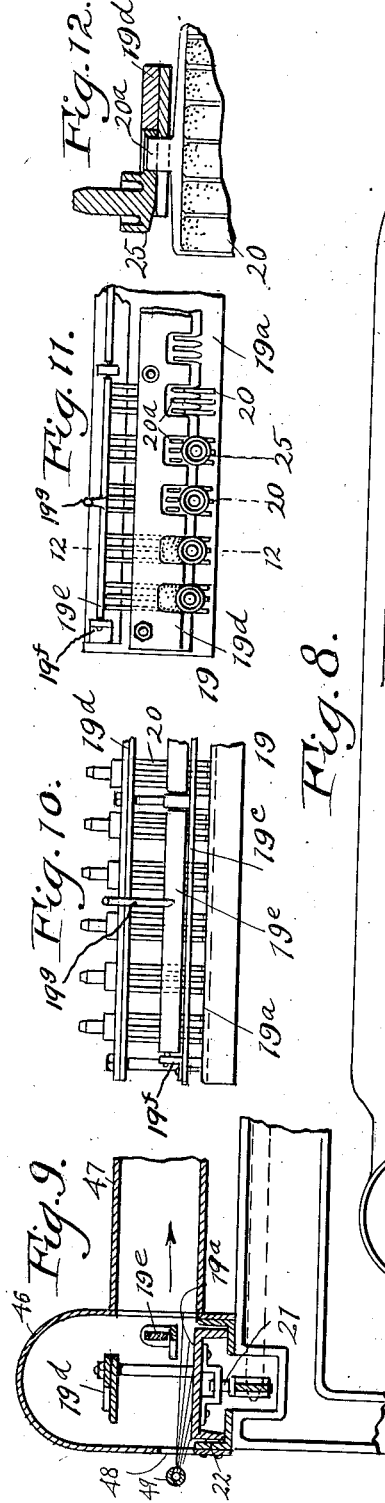
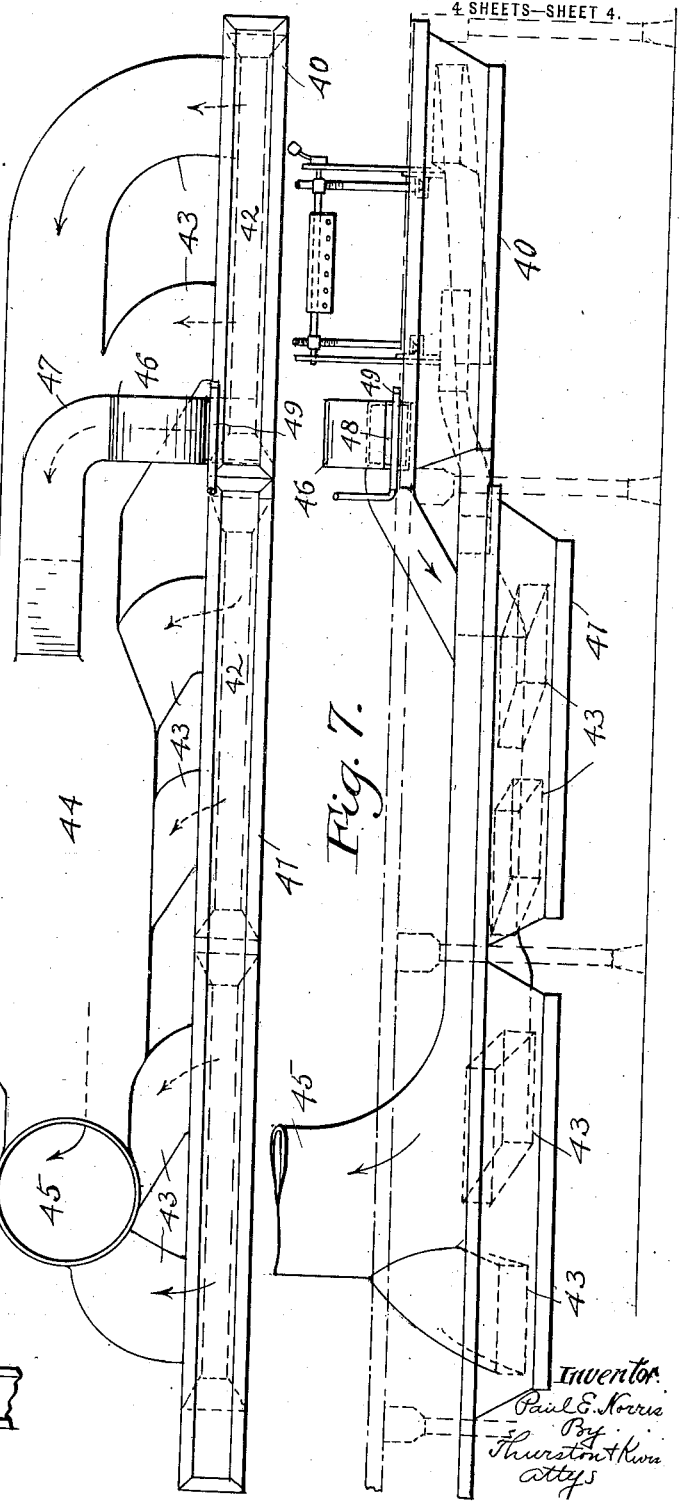

UNITED STATES PATENT OFFICE.

PAUL E. NORRIS, OF EAST CLEVELAND, OHIO, ASSIGNOR TO WILLARD STORAGE BATTERY COMPANY, OF CLEVELAND, OHIO, A CORPORATION OF WEST VIRGINIA.

LEAD-BURNING MACHINE FOR STORAGE-BATTERY PLATES.

1,389,155.   Specification of Letters Patent.   Patented Aug. 30, 1921.

Application filed October 10, 1918. Serial No. 257,676.

*To all whom it may concern:*

Be it known that I, PAUL E. NORRIS, a citizen of the United States, residing at East Cleveland, in the county of Cuyahoga and State of Ohio, have invented a certain new and useful Improvement in Lead-Burning Machines for Storage-Battery Plates, of which the following is a full, clear, and exact description.

This invention relates to a machine for lead-burning so-called straps to storage battery plates or elements.

As is well known, in a storage battery there are two groups of plates designated the positive plates and negative plates respectively, and each group of plates is attached to a strap having a terminal which generally projects up through the cover of the battery cell. The straps are electrically and mechanically secured to lugs on the battery plates in one of two ways, either the groups of plates are placed in molds and the straps and terminal posts are cast onto the lugs, or the straps with their projecting posts and with slots to receive the lugs of the plates are separately cast, and are subsequently lead-burned to the plates. This last mentioned method is used more generally than the method of casting the straps onto the lugs of the plates.

When the straps are previously or separately formed and lead-burned to the lugs of the plates, the operation is usually carried out by hand, in which event an operator places one or more groups of the plates in a frame with the lugs projecting therethrough, fits the straps over the lugs, and with an oxy-acetylene flame manipulated by hand, lead-burns the straps to the lugs.

The present invention relates to a machine which lead-burns the straps to groups of battery plates supplied thereto, and has for its object to provide a machine by which the operation can be carried on rapidly, efficiently and continuously, or without liability of interruption by some part or parts not working smoothly or in complete harmony with the other parts.

Further the invention aims to provide a machine which is operated with ample degree of safety to the operators who work about the machine, and with a minimum liability of affecting the health of the operators through lead dust and dust from the paste or active material with which the grids of the plates are filled.

Still further the invention aims to provide a machine so constructed and operated that the work can be carried on very effectively by unskilled operators.

The invention may be further briefly summarized as consisting in certain novel details of construction and combinations and arrangements of parts which will be described in the specification and set forth in the appended claims.

In the accompanying sheets of drawings wherein I have shown the preferred form of my invention, Figure 1 is a top plan view of the middle and right hand portion of the machine; Fig. 2 is a similar view of the left hand portion; Fig. 3 is a transverse sectional view substantially along the line 3—3 of Fig. 1; Fig. 4 is a similar view substantially along the line 4—4 of Fig. 2; Fig. 5 is a side view of a little more than that portion of the machine shown in Fig. 2; Fig. 6 is a side view of the remaining portion, or substantially that shown in Fig. 1, Figs. 5 and 6 showing the machine as viewed from the near side of Figs. 1 and 2; Fig. 7 is a view somewhat diagrammatic, showing partly in side elevation the suction apparatus by which dust and other small particles are withdrawn from the vicinity of the workmen around the machine; Fig. 8 is a plan view of the same; Fig. 9 is a transverse sectional view of a portion of the machine, showing particularly the pneumatic arrangement for cleaning foreign particles from the empty racks just before they are filled with plates; Fig. 10 is a view looking toward the rear of a portion of one of the plate receiving racks, stocked with groups of plates; Fig. 11 is a top plan view of the same; Fig. 12 is a view on an enlarged scale, partly in vertical section along the line 12—12 of Fig. 11, showing the top of the rack, one of the plates, and one of the straps which is to be lead-burned to a group of plates; and Fig. 13 is a perspective view of the rack.

The machine constituting the subject matter of my invention includes an elongated frame 10 formed principally of structural materials and having at spaced points, legs which extend down to and rest on the floor. This frame is relatively narrow and of sufficient length to accommodate along the sides a series of workmen, each of whom has certain duties to perform essential to the successful and continued operation of the machine, as will be subsequently explained.

At the top of the frame 10 there is an endless conveyer in the form of an elongated chain 11 running in a guideway 12, (see Fig. 4) L-shaped in cross section, this guideway extending along both sides of the frame as shown in Figs. 3 and 4. At the ends of the frame there are two horizontally disposed sprockets 13 and 14 about which the chain passes, both sprockets being mounted at the ends of vertical supporting shafts 15 and 16, the latter of which is the driving shaft, driven by a motor 17 connected to the shaft 16 by speed reducing gearing designated as a whole in Fig. 6 by the reference character 18. By this mechanism the conveyer chain is caused to travel in a horizontal plane in a manner indicated by the arrows, i. e., to the left along one side, which is the charging or filling side for the plates, and to the right along the opposite side, where the straps are preferably applied and the lead-burning takes place.

This chain carries a series of racks, some of which are shown conventionally at 19 in Figs. 1 and 2, which racks are arranged close together and follow one another in continuous close succession along the working sides of the machine. Preferably each rack is long enough to accommodate many groups of plates, the number of which will depend upon the number of plates in each group. When the groups are composed of three positive plates and four negative plates, each rack can conveniently be of a length to accommodate approximately ten groups.

Each rack is preferably composed of a base 19$^a$, in the form of an inverted channel, also uprights in the form of bolts 19$^b$ supporting a rear slotted member 19$^c$ and an upper slotted member 19$^d$, the latter being designed to receive the lugs 20$^a$ of the plates 20 in the manner shown in Figs. 10, 11 and 12. Additionally each frame is provided along its rear side with suitable ejecting means which can be operated to push the plates with the straps lead-burned thereto, out from the slots and allow the operator to lift them from the rack. In this instance the ejecting means consists of rectangular bars 19$^e$, two of which are provided on each rack and each being pivoted at 19$^f$ and provided with an outwardly projecting handle 19$^g$ by which the operator may rock the member 19$^e$ so as to force the plates a distance out of the slots i. e. to sufficiently move them from the lead-burning position that they can be readily removed by the operator.

Each of these plate racks is pivoted at one point, preferably a little off-center, to one of the links of the chain, as indicated at 21 in Figs. 3, 4 and 9. As the racks travel along the sides of the frame they are caused to move in a straight line by upstanding guides 22, generally in the form of angle-iron flanges. At and around the sprocket wheels where the racks make the 180° turn, these guides are omitted, the bottoms of the racks then sliding over flat tables 23 which are formed around the sprocket wheels, as shown in Figs. 1 and 2, and are so shaped as not to interfere with the movement of the racks in making the turns.

Each of these tables is preferably provided with a rack shifting member 24 which assists in turning the racks so as to straighten them quickly into line with the guides along the intermediate working portions of the frame-work, i. e. between the end tables 23. Each of these turning devices includes a pivoted arm 24, pivoted at 24$^a$ and having an upstanding roller 24$^b$ which engages behind the outer downturned flange of the rack bottom member. A spring 24$^c$ is connected to this lever or arm 24. As the rack makes the turn about the sprocket at each end of the frame, the outer flange of the rack engages on the outside of the roller 24$^b$ at the free end of the pivoted arm 24 to which the tension spring 24$^c$ is attached. This is indicated in Fig. 2. As the rack moves along, it is held more or less transversely to the straight sections of the chain by the action of the roller on the arm 24, the inner flange of the rack then bearing against the upstanding flange of the sprocket precisely as shown in Fig. 2. As the movement continues, the roller 24$^b$ travels along the flange of the rack, and when it reaches a point just beyond the pivotal center 21 it flips the rack, so to speak, about the point 21, moving it into alinement with the straight section of the chain.

This quick turning of the racks is of importance in positioning the racks so that their straight line movement is increased, thus allowing maximum working space between the two ends of the chain. As will be apparent from Figs. 1 and 2, the rack turning device shown at the left hand end of Fig. 2 turns the racks so as to bring them more quickly into alinement with the straight section of the chain on the far or lead-burning side of the frame of the machine than would be the case if the rack turning device were not utilized. Similarly the turning device at the right hand end of Fig. 1 straightens the racks into alinement with the inner or unloading and loading side of the machine so as to give more time for the unloading and loading operations with a given length of machine.

After the racks are conveyed along the inner side of the machine, as viewed in Figs. 1 and 2, where the removing of the lead-burned plates and the loading of the empty racks with the groups of plates take place, and after they are carried along a portion of the opposite side where preferably the straps are inserted over the lugs of the groups of plates, one of these straps being shown at 25 in Fig. 12, the straps are lead-burned to the lugs of the plates by mechanism having several important features.

The lead-burning is done by oxy-acetylene flames through burner tips or nozzles 26, a series of which are arranged side by side with the tips at such angles and positions as to direct the flames so that the straps are effectively lead-burned to the lugs of all the plates. The tips or nozzles are connected to short pipes passing through what is termed a manifold 27, (see particularly Fig. 6) these tubes being connected by short flexible tubes 28 to one or more gas supply pipes 29. This lead-burning mechanism, including the tips and manifold are carried in an adjustable rectangular frame 30, which can be moved as a unit back and forth, toward and from the central plane of the machine by a screw and hand wheel 31 (see Figs. 1, 3 and 6). Additionally the manifold and the burners carried by it can be raised and lowered in the frame by a shaft 32, rotatably supported at the top of the frame, this shaft being adjustable through the medium of a hand wheel 33, and connected by bevel gearing to a pair of vertical screws 34, (see Fig. 6) which when turned, move the manifold down or up so as to bring the burners closer to or farther away from the parts to be lead-burned together. The manifold is mounted on a rod 35, having bearings in nuts 36 which travel up and down the screws 34, one end of this rod having a weight 37 by which the manifold can be held either in operative or inoperative position, the rod 35 being mounted in the nuts 36 for limited rocking or swinging movement so that the burner can be quickly swung toward or away from the work. The various adjustments provided in this burning apparatus are of importance not only in securing the best results for plates and straps of a given size or design, but they adapt the machine for plates and straps of different battery sizes and designs.

As the racks pass along the burning apparatus it is important that they be accurately positioned during the burning operation, and to this end I provide spring actuated presser shoes 38 which engage the inner flanges of the rack bottoms 19ª and press the outer sides or flanges against the straight line guide 22 extending along that part of the machine. The action of these presser shoes is best illustrated in Fig. 3.

On the side opposite to that at which the burning is done, or on that side where the unloading and loading of the racks is done, very important features which contribute a great deal to the success of the machine are provided. It will be observed by reference to Figs. 1, 2, 5 and 6, that along the last mentioned side of the machine are a series of unloading and loading tables. In this instance I provide one unloading table 40, and two loading tables 41, the latter being somewhat lower than the former. These tables are in the form of hollow boxes or suction chambers, each having a screened or perforated top 42, and the inner side of each is connected by ducts 43 to a suction conduit 44 which lies between the sides of the frame as shown in Fig. 3, and is connected to an upstanding pipe 45, to which a suction blower is suitably connected. To avoid confusion, I have omitted the ducts, conduit and pipe from Figs. 1, 2, 5 and 6, but in Figs. 7 and 8 these parts are shown, so that their arrangement with reference to the other parts will be apparent, especially when considered in connection with Fig. 3. The purpose of this suction system connected to the hollow tables or chambers 40 and 41 is to carry away all dust and small particles which drop from the plates, and prevent the dust from being circulated in the room around the operators, thus minimizing the danger of lead poisoning.

One additional feature of importance is to be explained, and that is the pneumatic scheme for cleaning the emptied racks just before they are loaded, of dust and other particles. To accomplish this, I provide near the left hand end of the unloading table 40, a hood 46, through which the emptied racks travel. The inner side of this hood is connected by a suction pipe or conduit 47 to the main suction conduit 44. The outer side of this hood has a slot 48, (see Fig. 9) and positioned alongside this slot, just outside of the hood is an air pipe 49, with air outlets so disposed that as the racks pass along under the hood a sufficiently strong blast of air is directed onto the rock bottoms 19ª to blow the dust and dirt into the suction pipe 47, from which the foreign particles will be drawn up into the upright pipe 45, and from the room in which the machine is located.

This method of cleaning the racks and preventing the dust and small particles of lead which fall from the plates from being circulated in the room keeps the air clear and pure instead of actually dangerous to the health of the operators.

The machine is operated in the following manner:

Starting from a point at which the filled racks are unloaded, as soon as the racks turn the right hand sprocket 14 and are straightened by the turning lever 24 on the table 23, an operator loosens the groups of plates by rocking the ejector bars 19ᵉ. This takes place while the racks are traveling along the table 23 on the inner side of Fig. 1. Then as the racks come opposite the unloading table 40, one or more operators slide the lead-burned plates, that is, the groups of plates with the straps lead-burned thereto, off of the racks onto the table 40, and they are then carried away by other operators. The racks are then pneumatically cleaned in the manner previously stated, and pass along the loading tables 41 onto which stacks of the positive and negative plates are placed. Here the workman slide the plates into the traveling racks, which are generally completely loaded before the racks reach the end sprocket 13.

As soon as the racks pass the end sprocket 13, other workmen working between the sprocket 13 and the burning apparatus, place the straps onto the groups of upstanding lugs and drive them down, if necessary, to properly position them, and when the racks reach the burning apparatus which has been previously adjusted for the type and size of plates being lead-burned, they are pressed outward by the presser shoes in proper position with reference to the jets or flames and the straps and lugs on the plates are lead-burned together, thus mechanically and electrically joining together the plates of each group. Then the racks pass around the right hand sprocket 14, and the operation previously described is repeated. In this manner the plates and straps are lead-burned in continuous fashion without any, except possibly an occasional interruption, so that the cost of lead-burning is much reduced over that resulting from the previous hand work. Additionally, as before stated, the work can be done by unskilled operators with little danger of physical injury either through accident or from breathing poisonous materials.

Having described my invention, I claim:

1. In a machine for lead-burning straps to groups of storage battery plates, an elongated conveyer frame, a conveyer in the form of an endless chain traveling in substantially a horizontal path, racks carried by the conveyer adapted to be carried through a closed path, and lead-burning apparatus including flame directing devices located at one side of the frame, and tables for loading and unloading the racks at the opposite side of the frame.

2. In apparatus for lead-burning straps to groups of storage battery plates, a conveyer, racks carried by the conveyer for the plates and straps, lead-burning apparatus including a series of flame directing devices along which the racks are moved, a guide against which the racks are adapted to bear, and yieldable means adjacent the burning apparatus for pressing the racks against the guide in passing said burning apparatus.

3. In a machine for lead-burning straps and groups of storage battery plates, a frame, a conveyer in the form of an endless chain having straight sections traveling in substantially a horizontal plane, sprockets at the ends of the frame and about which said chain passes, racks independently supported and having a pivotal connection with said chain and moved thereby in a closed path around said frame, and means at the end of the frame adjacent one of the sprockets for independently and successively turning the racks into alinement with one of the straight sections of the chain as the racks pass about the sprocket.

4. In an apparatus for lead-burning together straps and storage battery plates, a conveyer, racks adapted to be filled with storage battery plates shifted by said conveyer, lead-burning apparatus along which the racks are moved, said burning apparatus comprising a plurality of flame directing devices and a holder therefor, the said flame directing devices being pivotally mounted in the holder so that they may be simultaneously swung downward to operative position or upward to inoperative position.

5. In a machine for lead-burning together straps and groups of storage battery plates, a conveyer, holders for the plates carried by the conveyer, a frame along which said conveyer travels, and including a guide for the conveyer, a lead-burning apparatus along which the articles to be lead-burned are carried; and a table alongside the frame displaced from the lead-burning apparatus, said table being formed of a chamber with a perforated or open top, and means for producing a continuous suction of air from said chamber.

6. In a machine for lead-burning together straps and groups of storage battery plates, a conveyer, holders for storage battery plates movable along a given path by the conveyer, lead-burning apparatus at a certain point along the path of movement of the conveyer, a loading table along the conveyer in advance of the lead-burning apparatus, said loading table being in the form of a perforated support, and apparatus by which air is drawn through said table.

7. In a machine for lead-burning straps to groups of storage battery plates, a conveyer, holders for the plates movable along a given path by the conveyer, lead-burning apparatus along which the holders move, unloading and loading tables along the conveyer, said tables being in the form of perforated or open work members, together with means for producing a movement of air through said tables.

8. In a machine for lead-burning straps to groups of storage battery plates, a conveyer, holders for the plates movable along a given path by the conveyer, lead-burning apparatus along which the holders move, unloading and loading tables along the conveyer, said tables being in the form of hollow chambers with perforated or open stops, and suction apparatus connected to said chambers.

9. In apparatus for lead-burning straps to storage battery plates, a series of holders for the plates, a conveyer movable along a given path for shifting said holders, lead-burning apparatus along which the holders are carried, a loading table along the conveyer at which plates are adapted to be inserted in the holders, and means in advance of said table for cleaning the holders.

10. In a machine for lead-burning straps to groups of storage battery plates, an endless conveyer, racks carried thereby and adapted to receive groups of storage battery plates, lead-burning apparatus along which the racks are moved, unloading and loading tables along the conveyer, and pneumatic means in advance of the loading table for cleaning the racks.

In testimony whereof, I hereunto affix my signature.

PAUL E. NORRIS.